United States Patent [19]
Chan et al.

[11] Patent Number: 5,930,387
[45] Date of Patent: Jul. 27, 1999

[54] METHOD AND APPARATUS FOR ENCODING COLOR IMAGE DATA USING DYNAMIC COLOR MATCHING

[75] Inventors: Allen M. Chan; Kok S. Chen, both of Sunnyvale, Calif.

[73] Assignee: Apple Computer, Inc., Cupertino, Calif.

[21] Appl. No.: 08/985,197

[22] Filed: Dec. 4, 1997

Related U.S. Application Data

[63] Continuation of application No. 08/463,782, Jun. 5, 1995.
[51] Int. Cl.$^6$ ................ H04N 1/46; G03F 3/08
[52] U.S. Cl. ................ 382/166; 358/539; 358/523
[58] Field of Search ................ 358/539, 523, 358/518, 522, 519, 504, 525; 382/166, 167, 163, 162; 348/674, 61, 398, 420; 395/109, 114, 102; 345/153, 340, 339, 155, 149, 199, 202

[56] References Cited

U.S. PATENT DOCUMENTS

| | | | |
|---|---|---|---|
| 5,278,678 | 1/1994 | Harrington | 358/518 |
| 5,467,110 | 11/1995 | White et al. | 345/199 |
| 5,543,820 | 8/1996 | Edgar | 358/519 |
| 5,638,190 | 6/1997 | Geist | 358/518 |
| 5,768,481 | 6/1998 | Chan et al. | 395/102 |

*Primary Examiner*—Edward L. Coles
*Assistant Examiner*—Cheukfan Lee
*Attorney, Agent, or Firm*—Burns, Doane, Swecker & Mathis, L.L.P.

[57] ABSTRACT

The present invention is related to systems and methods for compressing image data while at the same time, improving both the compression ratio and the perceptibility of the decompressed image using a dynamic color matching scheme. Such features are achieved even when the image data is compressed without segregation into its scanned and non-scanned components. Color variant data is encoded using a dynamic color matching scheme to enhance the color fidelity of a decompressed image obtained from the encoded color variant data. As a result, improved perceptibility of decompressed images is achieved regardless of whether scanned images, non-scanned images or any combination thereof are collectively compressed. Such improved perceptibility is achieved regardless of whether the images are monochrome (having varying grey scale values) or color. In addition, improved perceptibility is realized in a manner which permits image data including scanned and/or unscanned images to be compressed in real-time.

19 Claims, 5 Drawing Sheets

FIG. 3A
FIG. 3B
FIG. 3C
FIG. 3D
FIG. 3E
FIG. 4A
FIG. 4B

METHOD AND APPARATUS FOR ENCODING COLOR IMAGE DATA USING DYNAMIC COLOR MATCHING

This application is a continuation of application Ser. No. 08/463,782, filed Jun. 5, 1995.

BACKGROUND OF THE INVENTION

1. Field of the Invention:

The present invention relates generally to compression and decompression of digitized image data used, for example, to represent text, graphics and scanned images. More particularly, the invention relates to encoding variant color image data during compression of the image data, while retaining enhanced fidelity of decompressed images.

2. State of the Art:

Digitized images displayed on scanners, monitors and printers are typically quantized on a pixel-by-pixel basis and stored in memory as pixel maps, more commonly referred to as pixmaps. A pixmap is a two-dimensional array of picture elements mapped to locations of the digitized image.

To provide sufficient color range and fidelity, each pixel is typically stored in memory as a set of color coordinates which define the pixel's color location in a given color space. For example, a pixel is typically represented by its red, green and blue color component values, or by its cyan, magenta and yellow color component values. The fidelity of the color reproduction is a function of the accuracy with which each color component is represented.

Due to the increased volume of data required to represent color images, effort has been directed to compression of color data pixmaps. Because it is not practical or possible to provide a digital representation for all possible colors, the data used to represent each color component is necessarily compromised. Color fidelity is further compromised when the data used to represent the various colors of an image is compressed.

Early attempts at image compression relied upon techniques deemed suitable for non-scanned image data (such as text and synthetic graphics), assuming that they would work equally well for scanned images. One such technique was run-length coding, as described in "Inside Macintosh, Volumes I, II, III", Addison-Wesley, Reading, Mass., 1985, ISBN 0-201-17737-4. Run-length compression exploits the repetition of pixel values in long data "runs" by transmitting a single pixel value together with the length of the "run". Such techniques are relatively simple and effective for data used to represent text and line-art. However, run-length coding techniques have proven less suitable for scanned images (such as scanned photographs or video images) where numerous colors typically exist.

More advanced compression techniques are directed to maintaining color as close to full fidelity as possible. However, these techniques are theoretically "lossy" in that information content (such as edge acuity of text included in the image) is not maintained.

Known efforts for compressing image data have addressed this drawback of compression techniques by segregating the data of a pixmap into two components: (1) scanned image components and (2) all remaining components (such as text and synthetic graphics). Once segregated, the scanned image components are passed through compression techniques better suited for compressing scanned images (such as the JPEG industry standard compression techniques). The remaining components of the image data are separately passed to compression techniques better suited for objects that require good edge acuity (such as run length encoding).

However, this technique of segregating image data components suffers significant drawbacks. One such drawback is that the function of segregating presents problems. Objects included within the image data have to be tagged as scanned image data or as non-scanned image data before being placed into the pixmap. Otherwise, there is no way of determining the type of object to which a pixel belongs. Additional complexities result when overlapping areas of scanned images and non-scanned images are included within the image data.

Accordingly, it would be desirable to provide a technique for compressing image data without requiring the complexities associated with segregating the image data into its scanned and non-scanned components. It would further be desirable to reduce any perceptible degradation of the decompressed image, regardless of whether the image data includes scanned images, non-scanned images or any combination thereof. For variable color images (that is, images which include two or more different colors or grey scale levels), it would be desirable to accurately encode the colors in a manner suitable for achieving high compression ratios without sacrificing color fidelity as perceived by the unaided eye when the compressed color variant image data is decompressed.

For color images, high compression ratios can only be achieved if the vast number of colors (including grey scale values) extant in the world are represented with a substantially reduced color palette. However, no known techniques have successfully achieved such a reduction without a substantial sacrifice of color fidelity. This lack of color fidelity is aggravated when attempts are made to compress both scanned and unscanned images collectively, without the benefit of segregation; that is, compressed digital data formats which are chosen to preserve the edge acuity of non-scanned images thereby reduce the number of data bits available to preserve color fidelity unless the width of the compressed data work used to represent each pixel and/or overall memory size is substantially increased. This lack of color fidelity is further aggravated when real-time compression of an incoming data stream is required. In the past, constraints associated with real-time compression have required the use of a severely limited color palette to reduce processing time.

Thus, it would be desirable to provide a technique for compressing image data which does not impose large memory requirements and which does not sacrifice color fidelity when the data is decompressed, even when: (1) scanned and unscanned image data is compressed collectively; and (2) the image data is compressed in real-time.

SUMMARY OF THE INVENTION

The present invention is directed to systems and methods for compressing image data while at the same time, improving both the compression ratio and the perceptibility of the decompressed image using a dynamic color matching scheme. In accordance with exemplary embodiments, such features are achieved even when the image data is compressed without segregation into its scanned and non-scanned components. In accordance with exemplary embodiments, color variant data is encoded using a dynamic color matching scheme to enhance the color fidelity of a decompressed image obtained from the encoded color variant data. As a result, improved perceptibility of decompressed images is achieved regardless of whether scanned images, non-scanned images or any combination thereof are collectively compressed. Exemplary embodiments achieve such improved perceptibility regardless of whether the images are monochrome (having varying grey scale values) or color. In addition, improved perceptibility is realized in a manner which permits image data including scanned and/or unscanned images to be compressed in real-time.

Generally speaking, exemplary embodiments relate to a method and apparatus for processing a frame of image data by: encoding each detected color in said frame of image data with an index to a look-up table during compression of said frame of image data; storing a plurality of color values in said look-up table which correspond to each of said detected colors; and dynamically updating said plurality of color values stored in said look-up table when a number of colors detected in said frame of image data exceeds a predetermined number.

BRIEF DESCRIPTION OF THE DRAWINGS

Other objects and advantages of the present invention will become more apparent from the following detailed description of preferred embodiments when read in conjunction with the accompanying drawings wherein like elements are designated by like numerals and wherein:

FIGS. 3a–3e illustrate exemplary formats for encoding color variant image data;

FIGS. 4a–4b illustrate exemplary representations of image data and partially prequantized image data, respectively.

DETAILED DESCRIPTION OF THE PREFERRED EMBODIMENTS

1. System Overview

Figure 1:
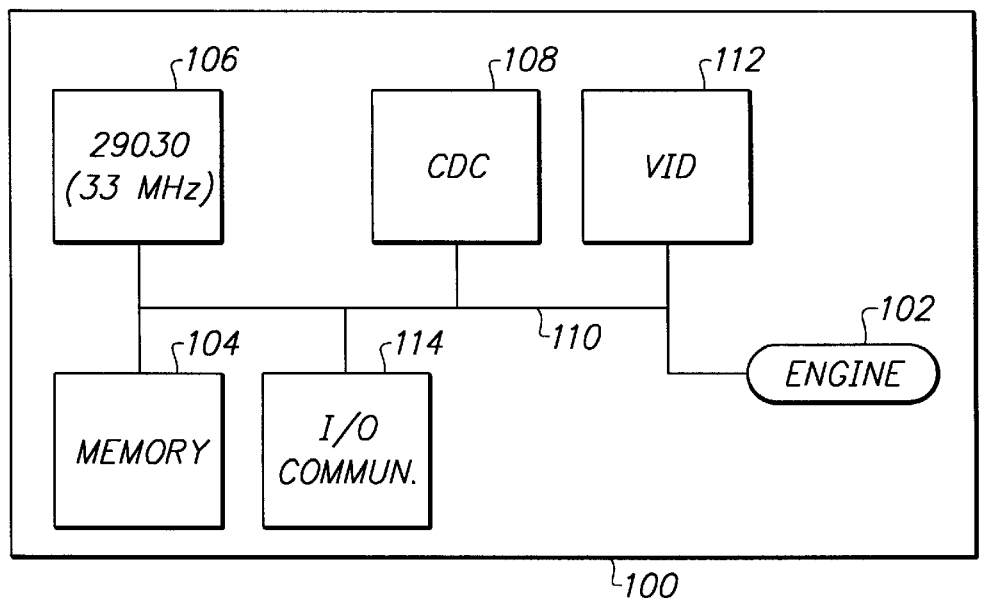
FIG. 1 illustrates a printing control system which incorporates an exemplary embodiment of the present invention.

FIG. 1 illustrates an exemplary embodiment of an apparatus for processing a frame of image data such that the image data can be encoded for compression in accordance with an exemplary embodiment of the present invention. As referenced herein, image data corresponds to data obtained from an image that can be quantized (for example, digitized) for storage in a pixmap and subsequently compressed. Image data that is compressed in accordance with exemplary embodiments of the present invention can be digitized image data captured through any instrumentation, such as a video camera.

Image data as referenced herein encompasses scanned data as well as non-scanned data. Non-scanned data typically includes character glyphs and graphical data, such as hand-sketched or computer generated graphics. Those skilled in the art will appreciate that image data processed in accordance with exemplary embodiments of the present invention can also include any combination of scanned and non-scanned data.

As referenced herein, a frame of quantized image data corresponds to a preselected group of digitized data, such as the data associated with a display screen or a printed sheet. Typically, such image data is obtained from or reproduced using a scanner device, a monitor or a printing device. However, those skilled in the art will appreciate that the image data can merely be processed for transfer between two locations (for example, between two computers).

It will be appreciated that exemplary embodiments of the present invention can be applied to the processing of image data for reproduction using any visual medium. In the case of printing, the image will typically be reproduced on conventional size paper such as letter size, A4, B5 and legal size. However, those skilled in the art will appreciate that the present invention can be applied to images of any size which are reproduced in any format.

To facilitate an understanding of the present invention, FIG. 1 illustrates a printing system 100 which incorporates features of the present invention. The FIG. 1 printing system includes a color laser engine 102, such as any commercially available color laser marking engine. For purposes of the following discussion, the term "color" includes use of multiple colors (such as red, green and blue), as well as gray-scale printing using varying shades of gray.

Referring to FIG. 1, an incoming frame of data is directed by a processor, represented as printing system controller 106 having associated memory 104, to a compression/decompression coprocessor 108 (CDC). In the exemplary embodiment of FIG. 1, the printing system controller 106 partitions a frame of quantized image data into partitioned blocks. The compressor/decompression coprocessor 108 constitutes an exemplary apparatus for processing a frame of quantized image data by compressing the image data within each of the partitioned blocks. More particularly, the coprocessor 108 includes a processor for prequantizing image data by selectively eliminating bits used to represent at least one color component of each pixel for the frame of image data and for encoding the remaining bits of the prequantized data to compress prequantized data.

Because the amount of memory typically required to store an entire frame of image data within the printing system 100 is impractical, an entire frame of uncompressed data is not stored within the printing system 100 at any given time. Rather, a frame buffer stores the incoming frame of image data in portions (for example, on a row-by-row basis), for sequential processing. As each portion of the frame is compressed, another portion is fetched by the printing system controller. As a result, an entire frame of image data is only stored in the print system 100 after it has been compressed in a manner to be described in accordance with exemplary embodiments of the present invention.

In accordance with exemplary embodiments, the printing system controller 106 can be a reduced instruction set computer (RISC) such as the 33 Megahertz 29030 processor available from Advanced Micro Devices. The printing system controller 106 pre-processes an incoming frame of image data to: (a) scale the image data to a desired resolution; (b) partition the image data into partitioned blocks of a predetermined size; (c) resample the image data to ensure its alignment with the partitions; (d) filter the image data to ensure that each partitioned block contains no more than a predetermined number of color variations; and (e) create a side information buffer with information acquired during the pre-processing that can be used to enhance performance during subsequent processing.

In accordance with exemplary embodiments, the compressing of image data includes an initial step of classifying each partitioned block based on whether the partitioned block is determined to be color variant (that is, multiple colors and/or grey scales) or determined to be color invariant (that is, including a single color). This step of classifying can be implemented by comparing the pixels within a given partitioned block to one another during the pre-processing to determine whether a given partitioned block is color variant or color invariant. Once having classified each partitioned block as being either color variant or color invariant, the compression/decompression co-processor 108 can be used to further compress the data. Those skilled in the art will appreciate that the steps of classifying each partitioned block as being either color variant or color invariant can be performed by the printing system controller 106 as part of the pre-processing (for example, classification information can be stored in the side information buffer), or can be performed by the compression/decompression coprocessor 108.

In accordance with exemplary embodiments, the compression/decompression coprocessor compresses the image data included in the partitioned blocks of pixels to substantially reduce the memory requirements required to store a frame of image data. The compression/decompression coprocessor compresses the image data within each partitioned block by representing a block which is determined to include color variations with less color fidelity than a block which is determined not to include color variations. Further, the compression/decompression coprocessor uses memory (that is, any specified memory) for storing the compressed image data as a representation of the original image. Alternately, the compressed image data can be immediately transmitted from the printing system 100 as it is compressed, for external buffering and decompression.

In an exemplary embodiment, a decompression engine is included within the compression/decompression coprocessor for use during the compression process. Recall that an entire frame of uncompressed image data is not stored in the printing system 100 at any given time; rather the entire frame is stored and compressed in sequentially processed portions. The decompression engine is provided within the compression/decompression coprocessor to accommodate a situation where newly received image data is to be superimposed on portions of the frame which have been earlier compressed. In this situation, the earlier compressed portion of the frame is retrieved, decompressed and returned to the frame buffer. The decompressed data which has been returned to the frame buffer is then overlaid with the newly received image data, after which the superimposed image data is recompressed.

The compression/decompression coprocessor 108 can, for example, be formed as a monolithic application specific integrated circuit (that is, an ASIC chip). However, those skilled in the art will appreciate that the processing implemented by the coprocessor 108 can be performed by the same processor used to implement the functions of the controller 106. Alternately, the compression/decompression functions can be implemented with any or all other functions of the FIG. 1 system in a single ASIC using a single processor. Further, those skilled in the art will appreciate that the compression and decompression functions of the FIG. 1 system can be implemented in software or hardware. In the exemplary FIG. 1 embodiment, the compression functions are implemented using software and hardware, while the decompression functions are primarily implemented in hardware.

Once a frame of image data has been compressed and stored in the compression/decompression coprocessor, it can subsequently be transferred to the printer engine 102 via a system bus 110 and a video interface device (VID) 112. The video interface device can, for example, be formed as a separate ASIC chip having a decompression processor to support decompression and half-toning. Alternately, a single processor can be used to implement the functions of the controller 106, the coprocessor 108 and video interface device 112. The video interface device provides high quality reproduction of the original image from its compressed format.

The FIG. 1 system further includes an input/output (I/O) communications device 114. The input/output communications device can include, for example, built-in networking support as well as parallel/serial I/O ports. Further, the I/O communications device can include additional memory as well as memory expansion ports. Any conventional I/O communications features can be used in accordance with the present invention, such that the I/O communications device need not be described in detail.

Before describing the compression/decompression operation in detail, the data format of uncompressed image data will be described. Afterward, pre-processing of the uncompressed image data will be discussed. Further, exemplary data formats of compressed image data will be discussed.

2. Uncompressed Image Data Format

A frame of image data associated with an original image has a given width and length. The number of pixels in a given row of a scan line across the width of the frame is set in a horizontal total pixel count register. In accordance with exemplary embodiments of the present invention, the value set in the horizontal total pixel count register is divisible by 4.

In a vertical direction, along the length of the frame (and in the case of printing, along the paper motion direction), the number of pixels is set in a vertical total pixel count register. Again, the value set in the vertical total pixel count register of exemplary embodiments is divisible by 4.

In accordance with exemplary embodiments, the user can also set the number of bits used to represent each color component for a given pixel to 1, 4 or 8 bits. For example, if the user selects 4 color components to define a pixel, with each color component being represented by 8 bits, then each pixel would be represented as a 32-bit word (that is, 8 bits for each of the cyan, magenta, yellow and black color components).

In accordance with exemplary embodiments, the color of a pixel can be represented by any number of color components, including 1, 3 or 4 color components. For example, a four color component representation includes cyan, magenta, yellow and black color components. For a given application, when the number of color components used to represent a given color is set to 1, the color of a pixel is defined by the magnitude of a single color component (such as black). When the number of color components is set to three, the color components used can be cyan, magenta and yellow color components. When the number of color components is set to be four, the 4 color components mentioned above can be used to define the color of a given pixel.

Where each of four color components in each pixel of a pixmap is encoded with 8 bits, a letter-size page having approximately 32 million, 600 dots per inch (dpi) color pixels, requires approximately 128 Megabytes of memory to store the page. Because a memory requirement of 128 Megabytes per page is cost prohibitive, exemplary embodiments of the present invention are directed to compressing this data in a manner which ensures the integrity of color fidelity in the decompressed image.

3. Pre-processing of Image Data

As mentioned previously, uncompressed image data which is received for storage in the frame buffer is preprocessed to optimize the compression process. The preprocessing includes: (a) scaling a frame of digitized image data to ensure that each partitioned block will have the same number of pixels; (b) partitioning the frame into blocks having a predetermined number of pixels; (c) resampling the image data to account for misalignment between the frame of image data and partitioned blocks; (d) filtering to reduce the number of color variations within each partitioned block to a predetermined number; and (e) creating a side information buffer which identifies each partitioned block as either color variant, color invariant or clean to enhance subsequent performance during compression. The preprocessing can be performed in a manner as described in commonly assigned U.S. application Ser. No. 08/397,372 filed Mar. 2, 1995 (Attorney Docket No. P1481/149), entitled "METHOD AND APPARATUS FOR COMPRESSION OF DIGITIZED IMAGE DATA USING VARLABLE COLOR FIDELITY", the disclosure of which is hereby incorporated by reference in its entirety. For example, the steps of partitioning and filtering can be implemented as follows:

a. Partitioning

Each frame of image data is partitioned into blocks formed as 4-by-4 pixel arrays. The exact block size can be set by the user as a block size field stored in a register.

Those skilled in the art will appreciate that the partitioned blocks can have any number of pixels, and that the blocks can be of any desired shape. It is only preferable that the blocks are capable of being tiled in non-overlapping fashion to encompass the entire image. For example, the shape of each partitioned area need not be square, but can be rectangular, cross-shaped, or shaped as described in "Tilings and Patterns, an Introduction", by W. H. Freeman, N.Y., 1989, ISBN 0-7167-1998-3, the disclosure of which is hereby incorporated by reference.

Those skilled in the art will appreciate that such partitioning is not limited to a single shape, but can be a combination of shapes. Further, those skilled in the art will appreciate that non-tiled and/or non-overlapped blocks can be used at some possible expense to the compressed buffer size and/or the integrity of the compressed data relative to the original image.

b. Color Variation Limiting

In accordance with exemplary embodiments, the compressing of image data includes the step of classifying each partitioned block as color variant or color invariant. In connection with this step of classifying, the image data is processed to ensure that no partitioned block includes greater than a predetermined number of color variations. Such processing can be achieved in any number of ways.

In an exemplary embodiment, each partitioned block is limited to at most two different colors. The two colors which are retained can be those deemed furthest from one another in a given color space. However, those skilled in the art will appreciate that each partitioned block can be limited to any number of colors (for example, 7 or more colors).

For example, where each partitioned block is limited to two colors and where a given block includes the colors red, blue and light blue, the light blue pixels can be converted to blue. Where more than two colors within a partitioned block are separated from one another in a given color space by more than a predetermined amount (e.g., a partitioned block includes the colors green, red and blue), color averaging of the pixels can be used to determine a single averaged color for all pixels within the partitioned block. Where color averaging is used, a previously multi-color partitioned block can be subsequently treated as a color invariant block (that is, a single color block) during the compression process.

In addition to the techniques mentioned above, an arbitrary selection of the colors which are to be retained can be used. For example, the first two colors detected in each partitioned block can be selected as the two colors to which all pixels in that block will be mapped.

In yet another embodiment, the color of the first pixel examined can be selected as the first color, and the color of each subsequent pixel can be compared against that of the first pixel. The color deemed furthest from the first color in a given color space can be selected as the second color, and each pixel in block can be mapped to one of these two colors.

The foregoing techniques for limiting the color variations of a partitioned block to a predetermined number are by way of illustration only. Those skilled in the art will appreciate that any number of such techniques can be devised.

4. Compressed Data Format

In accordance with exemplary embodiments of the present invention, a compressed data format (CD) is used whereby a single data word represents an entire partitioned block of pixels. For example, a single data word of up to 32 bits can be used to reconstruct what was previously described by the sixteen 32-bit words of a 4-by-4 pixel array, without creating noticeable color degradation of the decompressed image regardless of whether the image includes scanned images, non-scanned images or any combination of the two.

The location of compressed data in memory of the compression/decompression coprocessor is defined by a compression data pointer register. Because exemplary embodiments described herein are directed to the use of memory space having 32-bit word locations, words of up to 32 bits can be specified as a user-defined compressed data width field. In accordance with exemplary embodiments, a "compressed data word" is used to represent a compressed data block, and all such compressed data blocks are stored back-to-back in memory, regardless of the specified compressed data width, to maximize the use of memory.

In accordance with exemplary embodiments, two different word formats are used for compressed data: (1) a compressed data format for partitioned blocks determined to be color variant; and (2) a compressed data format for partitioned blocks determined to be color invariant. Color variant blocks are encoded with high edge acuity and reduced color fidelity, while color invariant blocks are encoded with high color fidelity. In exemplary embodiments, the most significant bit in both the color variant data block and the color invariant data block, referred to as the select (S) bit, identifies the compressed block as being either color variant or color invariant (that is, non-variant).

a. Color Invariant Compressed Data Block

Figure 2A:
FIGS. 2a–2d illustrate an exemplary format for encoding color invariant image data.
Figure 2B:
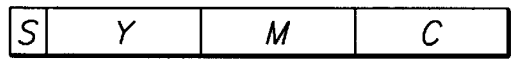
Figure 2C:
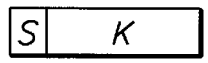
Figure 2D:
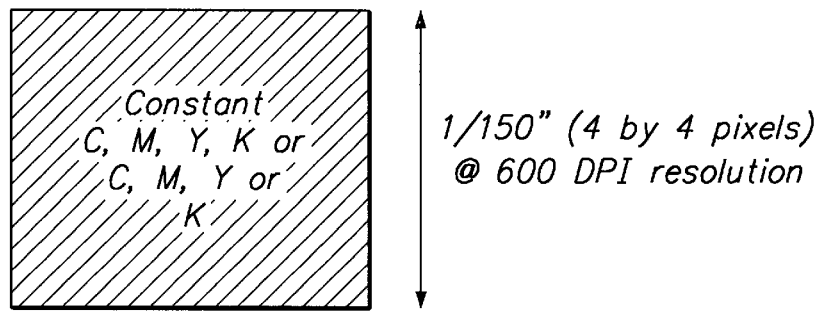

A non-variance compressed data block, as illustrated in FIG. 2a, is used to encode the pixels in a partitioned block where all pixels have the same color (see FIG. 2d). The user can specify the number of bits used to describe each color component of the single color associated with the color invariant block of pixels. Thus, the number of bits used to define each color component, in conjunction with the number of color components selected by the user to represent each pixel, will define the bits of a non-variance compressed data block.

In an exemplary embodiment, the number of bits used to describe the color of a color invariant block must be at least one bit less than the total number of bits available to describe each compressed data block of pixels (that is, 31 in the above example) to account for the select bit. In the exemplary embodiment described herein, the user can select any of three different sets of color components; that is, (1) cyan, magenta, yellow and black; (2) cyan, magenta and yellow; or (3) a single color component. Accordingly, three different types of non-variance compressed data blocks can be used, as illustrated in FIGS. 2a, 2b and 2c. In each case, a different number of bits can be used to represent the color components without exceeding the 31 bit limit of the exemplary embodiment.

For example, where black is the only color component used, up to 31 bits can be used to represent the black component of FIG. 2c. Of course, the FIG. 2c format can also be used where only the yellow, magenta or cyan color component has been selected to represent non-variant blocks. However, where all of the cyan, magenta, yellow and black color components are used, up to 7 bits can be used to represent each of these components via the FIG. 2a format; in this case the total word length, including the select bit, would be 29 bits.

b. Color Variant Compressed Data Block

Figures 3A, 3B, 3C, 3D, 3E, 4A, 4B:
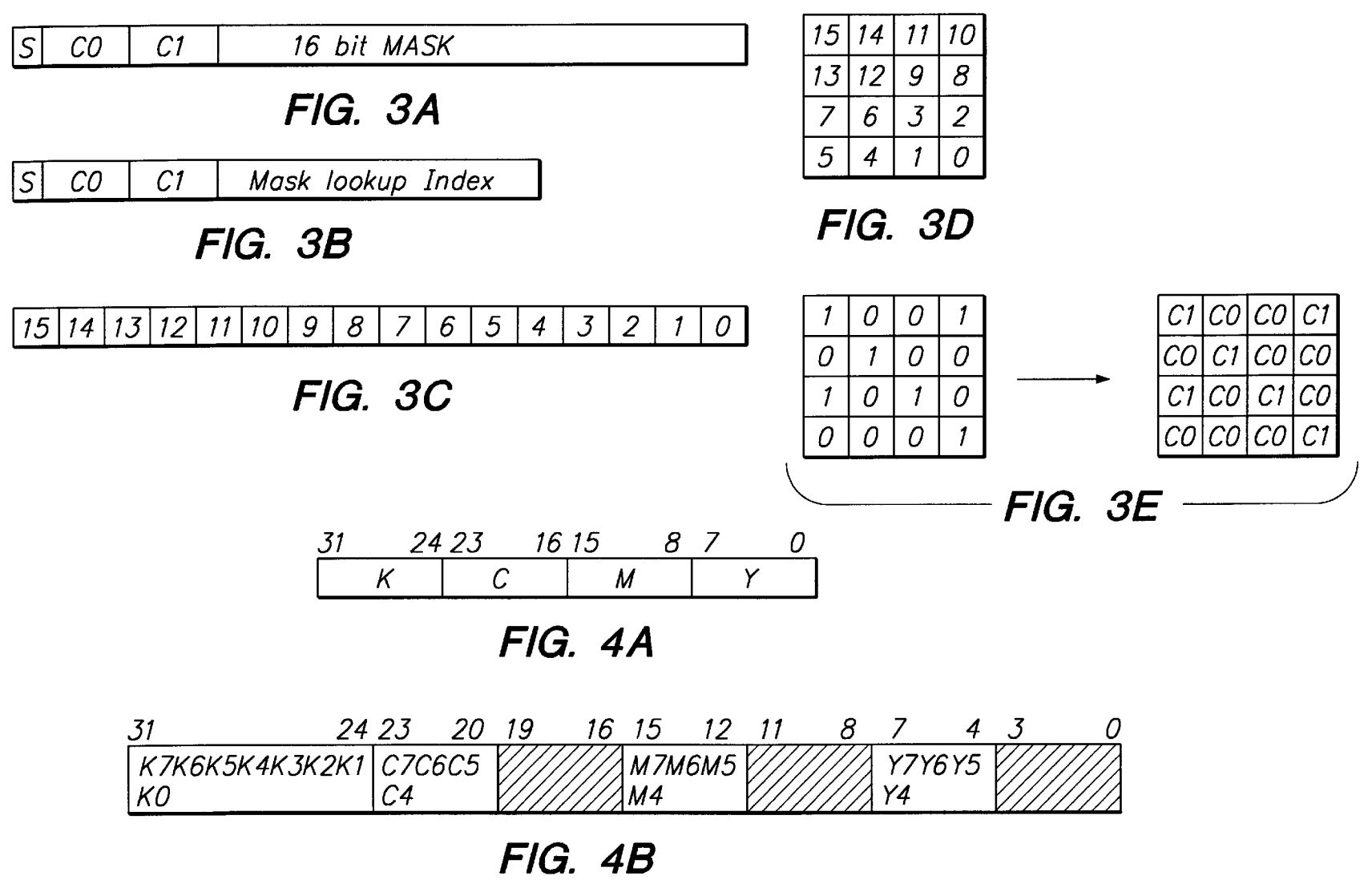

A color variant compressed data block, used to represent partitioned blocks that include pixels of various colors, is illustrated in FIG. 3a. An alternate embodiment of a color variant compressed data block is illustrated in FIG. 3b. These data formats include: (1) a predetermined number of indexed color locations; and (2) a mask for mapping each pixel of the partitioned, color variant block to one of the indexed colors. Recall that in accordance with exemplary embodiments, each partitioned block is pre-processed to include at most two different colors; the two colors for a given data block are, in an exemplary embodiment, represented in the compressed data blocks of FIGS. 3a and 3b as 6-bit color indices for a first color (C0) and a second color (C1).

The 6-bit values for C0 and C1, included within the variance compressed data block serve as indices for searching a variance color look-up table. In an exemplary embodiment, the variance color look-up table stores a plurality of 32-bit color values in 64 locations, with a specific location being addressed by the values of C0 and C1. For example, the first entry in the variance color look-up table can correspond to white and the last entry can correspond to black. All data entries in between correspond to various colors ranging from white to black, (that is, colors having varying amounts of the cyan, magenta, yellow and black color components).

As illustrated in FIG. 3a, the color variant compressed data block includes: a single bit location for the select bit; a 6-bit location for the color C0; a 6-bit location for the color C1; and a 16-bit mask wherein each bit corresponds to one pixel of the 4-by-4 block.

FIG. 3b illustrates the use of a compressed mask which serves as an index to a compression mask look-up table where a complete mask is stored. A compressed mask will be referenced herein as a mask index.

For partitioned blocks of 4-by-4 pixels having an uncompressed mask of 16 bits, compressed mask sizes of 8, 9 and 10 bits can be used in accordance with exemplary embodiments. However, those skilled in the art will appreciate that such mask sizes are by way of illustration only, and that any number of bits can be included in both the uncompressed mask and the compressed mask.

To accommodate use of the FIG. 3b mask format, the compression mask look-up table, which is pointed to by a mask base register, is included in memory. During compression, the 16 bit mask obtained from a 4-by-4 partitioned block can be used to index the compression mask look-up table which, in an exemplary embodiment, is a 64 k entry table. In an exemplary implementation, each location in the mask look-up table stores two compressed masks, such that the table is actually configured in memory as a 32 k-entry-by-32 bit table (note that multiple non-compressed masks can be mapped to the same compressed mask, if desired). During decompression, the mask base register points to a 1 k decompression mask look-up table, which in an exemplary implementation, is actually configured as a 512 entry memory wherein each entry includes two decompressed masks.

FIG. 3c illustrates an exemplary embodiment of a 16 bit mask. The numbers shown in each of the FIG. 3c bit locations illustrate the manner by which the 16-bit mask maps to pixel locations of the 4-by-4 partitioned block illustrated in FIG. 3d. With the data format of FIG. 3a, the 16 bit mask is stored, in its entirety, within the compressed data block. However, with the data format of FIG. 3b, the 16 bit mask is stored in the compression mask look-up table pointed to by the mask base register and addressed by the mask index included in the compressed data block.

FIG. 3e illustrates an example wherein the binary values of a 16 bit mask in a color variant compressed data block map either the color C0 or the color C1 to each of the pixel locations of the 4-by-4 partitioned block. In accordance with an exemplary embodiment, a value of 0 at any given location of the 16-bit mask can be considered to correspond to the color C0, while a 1 at any of the 16-bit locations in the 16-bit mask can be considered to correspond to the color C1. Thus, a 16-bit mask having the binary values illustrated in the left hand side of FIG. 3e will map the colors C0 and C1 to the pixel locations shown in the right hand side of FIG. 3e.

The C0 and C1 values can, in an exemplary embodiment, also be stored as compressed values within the compressed data block of FIGS. 3a and 3b. In this case, an additional encoding table can be provided to expand the compressed C0 and C1 values to an address for the variance color look-up table.

c. Encoding Of Variant Color Data For Variance Color Look-Up Table

In the exemplary embodiment described, color invariant compressed data blocks can use the entire 29 bit data block to represent a single color and thereby preserve high color fidelity. However, the exemplary color variant compressed data blocks use an exemplary 6-bit color index (that is, C0 or C1) to select a 32-bit color value from a 64 entry variance color look-up table. Because only 6-bits are used to represent a color, all colors extant throughout the world must be represented by the 64 colors included in the variance color look-up table. As described previously, color fidelity of color variant blocks is therefore sacrificed to preserve high edge acuity and reduce memory requirements. Recall that high edge acuity is obtained by encoding each of 16 pixels in a block with one of at least two different colors used to define edges in the image.

By using both color invariant data blocks and color variant data blocks, high edge acuity can be preserved in partitioned blocks which include edge information, while high color fidelity can be preserved in partitioned blocks which are color invariant (that is, blocks which do not include edge information). While color fidelity of color variant data blocks could easily be improved by increasing the number of bits used for each color index C0 and C1 (thereby increasing the number of 32-bit color entries included in the variance color look-up table), an increased width of the color variant data block would sacrifice processing speed to such an extent that real-time processing of an incoming data stream could become prohibitive. Accordingly, a goal of exemplary embodiments described herein is to optimize color fidelity of decompressed images generated from color variant data blocks while keeping the overall width of color variant data blocks (for example 29-bits) comparable to that of color invariant data blocks.

In accordance with exemplary embodiments of the present invention, a method and apparatus are provided for encoding the seemingly infinite array of different colors using only the 64 entries of the variance color look-up table. The 64 entries are chosen in a manner which optimizes color fidelity of an image that is reproduced from the color variant compressed data blocks.

FIG. 4a illustrates uncompressed image data representing at least one color component of a monochrome or color image for an exemplary pixel of a pixmap. In the FIG. 4a illustration, each of four color components used to represent the pixel is encoded with 8-bits. As shown in FIG. 4a, 8 bits are used to represent each of cyan (C), magenta (M), yellow (Y) and black (K) color components, such that a total of thirty-two bits are used to represent a single pixel of color data.

Recall that the color variant compressed data blocks of FIGS. 3a and 3b represent each pixel in a partitioned block of pixels (for example, 16 pixels) with one of two 6-bit color indices. All colors known to exist are therefore reduced to one of sixty-four 32-bit color entries stored in the variance color look-up table so that a decompressed 32-bit representation of color can be obtained for each pixel using the 6-bit index. In other words, the original 32-bits used to represent the color of each pixel in an input stream of image data are reduced to a 6-bit representation.

Note that while FIG. 4a illustrates a 32-bit color as having four 8-bit components, those skilled in the art will appreciate that any number of color components, represented with any number of bits can be used. For example, the 32-bits can be used to represent single color components (for example, grey scale images, or images formed of different shades of the same color). Those skilled in the art will also recognize that the 32-bits can be separated among the designated color components, in any desired manner. For example, a greater (fewer) number of bits can be used to represent a fewer (greater) number of color components. Further, while CMYK values are shown, those skilled in the art will appreciate that any known color space can be used (for example, RGB values).

In accordance with exemplary embodiments of the present invention, the encoded color indices are obtained from an exemplary 512 entry C0/C1 encoding table that is addressed by a 9-bit value. The 9-bit value used to address the C0/C1 encoding table is, in an exemplary embodiment, obtained from the 32-bit color value of the pixel by first dropping the four least significant bits of the cyan, magenta and yellow color components, leaving 20 bits. A predetermined combination of 9-bits is then selected from among these 20-bits. The 9-bits selected can be varied (that is, programmed) as desired based on any user specified criteria.

Figure 5A:
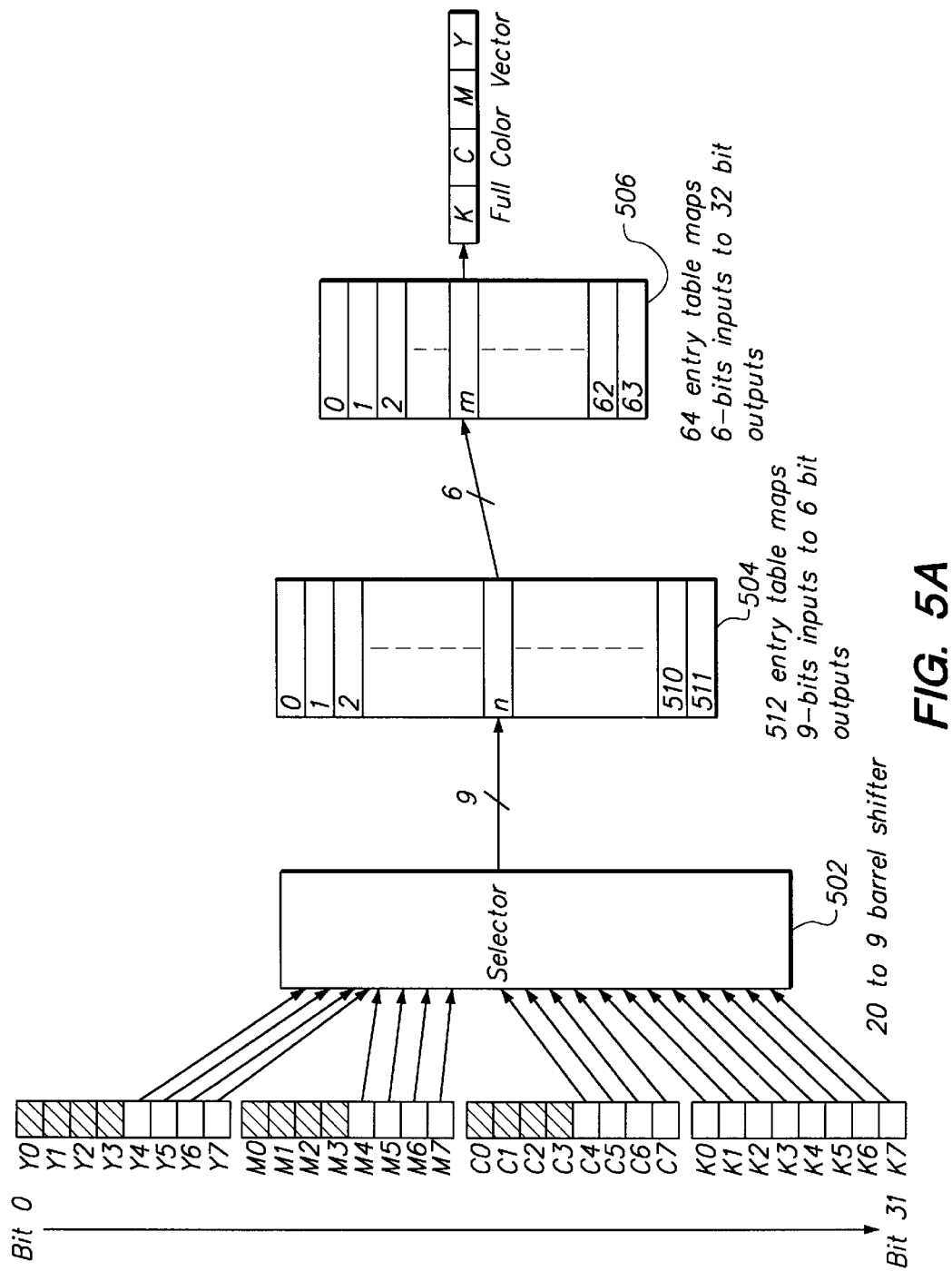
FIGS. 5a–5c illustrate exemplary embodiments of an apparatus for compressing image data in accordance with the present invention.

FIG. 5a represents a means for compressing the quantized image data within each partitioned block, and can, in an exemplary embodiment, be included as a hardware device in the compression/decompression coproccessor 108 of FIG. 1. In FIG. 5a, the 32-bits of the image data for the single pixel shown in FIG. 4a are illustrated as input values Y0–Y7, M0–M7, C0–C7 and K0–K7, corresponding to each of the yellow, magenta, cyan and black color components, respectively. These 32 bits are supplied as the input to a means, such as a selector 502, for prequantizing at least one color component of the image data by selectively eliminating predetermined bits used to represent at least one color component of a single pixel. The selector 502 can be a 20-bit-to-9-bit barrel shifter which receives inputs from 20 predetermined bit locations of the 32-bit image data. These 20 predetermined bit locations can be fixed in advance by the user, and reconfigured as desired.

In the exemplary FIG. 5a embodiment, the 20 selected bit locations include the four most significant bits used to represent each of the yellow, magenta and cyan color components. By also retaining the 8-bits of the black color component in the exemplary embodiment illustrated, all 256 shades of grey can be retained and used to control the black toner of a monochrome printer. The resultant bit locations received by the barrel shifter 502 are illustrated in FIG. 4b, wherein portions of the color pixel lost after this initial compression are shaded. The barrel shifter further prequantizes the image data by reducing the 20 selected bits to a 9-bit value. The 9-bits which are selected can, for example, be the three most significant bits for black, and the two most significant bits for each of the cyan, magenta and yellow color components. However, any combination of the bits can be used, such as the first, fourth and last bit of the black color component, and the first and fourth remaining bits of the cyan, magenta and yellow color components, or any other combination of bits. In an exemplary embodiment, the hardware barrel shifter thus functions as an interconnected matrix that can be altered by the user as desired (for example, on a page-by-page basis), or in response to any user selected criteria. Those skilled in the art will appreciate that software or any combination of hardware and software can be used to implement the selection process.

In the first prequantization level of compression, the 32-bit image data is thus selectively prequantized to encode the 32-bit input for each pixel as a 9-bit value. This prequantization achieves a seventy-two percent reduction in going from a 32-bit color pixel to a 9-bit color pixel.

In a second level of compression, the remaining 9-bits of prequantized image data are encoded to further compress the image data. In an exemplary embodiment, the 9-bit output of the barrel shifter is used to address the C0/C1 encoding table 504 of FIG. 5a which, in an exemplary embodiment, includes 512 entries. Each 9-bit address to the C0/C1 encoding table produces a 6-bit output which can be used as a color index.

Regardless of how C0 and C1 are selected from among the color indices associated with a given partitioned block in a frame of image data, all such color indices are generated using only two passes of color encoding. That is, the prequantizing pass followed by the encoding pass results in encoding the color of each 32-bit pixel as a 6-bit index (an eighty-one percent reduction).

The encoding of a 6-bit color index from a 9-bit value, in an exemplary embodiment, involves mapping each of the 9-bit values to one of the 64 colors in the variance color look-up table, represented as variance color look-up tale 506 of FIG. 5a. This mapping can be achieved in any known fashion.

d. Dynamic Color Matching

In accordance with exemplary embodiments, empirical data can be acquired to identify the most visually pleasing color representation to be stored in the variance color look-up table based on colors expected to be present in the input image data as described in commonly assigned co-pending application Ser. No. 08/463,787, filed Jun. 5, 1995, entitled "METHOD AND APPARATUS FOR ENCODING COLOR IMAGE DATA", the contents of which are hereby incorporated by reference in their entirety. This technique for storing values in the variance color look-up table thus involves identifying the colors to be included in the original image data and then rendering the image to identify 64 color values which represent the image with acceptable color fidelity. However, in accordance with an exemplary embodiment of the present invention, color values stored in the variance color look-up table are dynamically selected (such as the look-up table 506 of FIG. 5*a*).

As each 32-bit color value is obtained from a pixel in the original image data, 9-bits from this 32-bit value can be selected and mapped to a 6-bit index which identifies the first location in the variance color look-up table 506. The first color value stored in the variance color look-up table 506 is therefore the 32-bit value corresponding to the 32-bit color of the first pixel in the original frame of image data. As subsequent pixels in the original image data are received, each new color which is detected can be mapped in similar fashion to a 6-bit index value and the color value of the new color can be stored in the next sequential location of the variance color look-up table addressable by the 6-bit index value.

In accordance with an exemplary embodiment, this process can continue for each block in the frame of image data. If no more than 64 different colors are detected in the current frame of image data being processed, all detected colors of the input image data will be mapped to a color value entered into the variance color look-up table. The entries in the variance color look-up table therefore accurately represent the original 32-bit color values of the input image data.

However, if during processing a frame of image data, more than 64 different 32-bit color values are detected, all such values cannot be stored in the 64 entry variance color look-up table 506. Accordingly, exemplary embodiments include a step of dynamically updating the plurality of color values stored in the variance color look-up table when the number of colors detected in the frame of image data exceeds a predetermined number (for example, the predetermined number would be 64 in the foregoing discussion). A dynamic updating of the plural color values stored in the variance color look-up table can, in accordance with exemplary embodiments, be achieved by iteratively processing the bits used to represent each detected color in the frame of input image data.

An exemplary iterative process for encoding bits used to represent each detected color in the frame of image data and for dynamically updating the color values stored in the variance color look-up table can be performed by repeating the process described above. However, because more than 64 different colors were detected in the first iteration of processing, the re-processing of the input frame of image data can be performed by reducing the number of bits selected from the 32-bit color value of the image data. For example, rather than selecting 9-bits, 8-bits can be selected. The reduction from 9-bits to 8-bits can be achieved by reconfiguring the programmable selector 502 to select only 8 of the original 32-bit color values associated with each pixel.

For example, rather than selecting the two most significant bits for each of the cyan, magenta and yellow color components and the three most significant bits of the black color component, only the two most significant bits of all color components (that is, including the black color component) can be selected. Consequently, only 32-bit color values of the input image data which include a change in any of the two most significant bits for any color component will be mapped to a 6-bit index.

Because the variance color look-up table can no longer provide a one-to-one correspondence to actual colors included in the original image, measures must be taken to preserve color fidelity. For example, the entire three dimensional color space used to represent the original 32-bit color values can be divided in 256 non-overlapping areas. Each detected color in the input frame of image data can then be mapped to one of these 256 areas using the 8 selected bits from each pixel.

In other words, the color which is stored in the color variance look-up table for a given 32-bit color value can be determined by mapping each 32-bit value having the same digital values for each of the selected 8-bits to the same color in the 64 entry variance color look-up table. This color can, for example, be: (1) the first 32-bit color in the frame of image data which was detected to fall within the color space area defined by the 8 selected bits; (2) the last 32-bit color in the frame of image data detected to fall within the color space area defined by the 8 selected bits; (3) any color in between the first and last colors, as selected in any number of ways apparent to those skilled in the art (for example, the 32-bit color which is stored in the variance color look-up table can be a 32-bit representation of a color in the color space area statistically determined to occur most frequently in the original image data); or (4) any color selected by mathematically processing (for example, averaging) any one or more color values detected in the frame of image data and being associated with the same color space area. Any of these techniques, or any combination of these and other techniques, can be repeated for each of the 256 color space areas having at least one color included in the original frame of image data.

As an alternate to selecting 8 rather than 9 of the original 32-bits for each pixel during a second iteration, the re-processing can be executed using an additional look-up table for mapping the 9-bit values identified during the first iteration into the 8-bit values. The 9-bit-to-8-bit mapping can be achieved by dropping the least significant bit of the 9-bit value and encoding every two 9-bit values to a single 8-bit value. For each 8-bit value, one of the two 32-bit colors previously identified with respect to the 9-bit values can then be selected and stored in the variance color look-up table at a location identified by the 6-bit index. This process can be continued for the entire frame of image data.

To expedite processing, the remapping of the 9-bit values to 8-bit values can be implemented by merely reprocessing the data encoded into the C0/C1 encoding table and the variance color look-up table during the first iteration. The reprocessing of data in these tables can be performed up to the point where 64 different colors were identified during the first iteration, since that was the point at which processing was discontinued during the first iteration. From that point on, the original frame of image data can be processed to fill-out the C0/C1 encoding table and the variance color look-up table with color information.

Provided no greater than 64 different color values are detected via use of the 8-bit digital values, no further encoding is necessary. Thus, all 8-bit. values can be mapped to 6-bit indices for addressing the variance color look-up table.

However, if greater than 64 colors are still detected even when only 8-bits are used to represent each of the 32-bit values, a further iterative re-processing of the frame of image data can be performed to further reduce the number of bits from 8 to some other value (e.g., 7). This process can be performed, as described above, by either immediately selecting only 7-bits of the original 32-bits for each color value, or another look-up table can be provided for mapping the 8-bit values to 7-bit values which are then encoded into the 6-bit index values.

Alternately, if it is determined at any time during image data processing that greater than 64 colors exist in the original frame of image data, the color values in the original frame of image data can be directly mapped to 6-bit index values associated with a variance color look-up table having predetermined color values stored therein. Such a process can, for example, be implemented by iteratively re-processing the frame of image data to select 9-bits, and then immediately mapping the 9-bit values to the 6-bit index values. The color values stored in the variance color look-up table can, for example, be determined by using a pre-stored set of color values obtained by rendering a representative image, prior to processing the frame of image data.

Alternately, because it is known during the second pass that greater than 64 colors existed in the original frame of image data, the originally detected 64 different colors can be represented by some predetermined number of colors which are less than 64. For example, the original 64 colors detected during the first iteration can be reduced to 32 colors which are then stored as the first 32 entries of the variance color look-up table. As a result, 32 entries remain in the 64 entry variance color look-up table. The reduction of the original 64 different colors to 32 different colors for storage in the variance color look-up table can be performed in any known manner. For example, colors which are determined to be within a predetermined distance from one another within a given color space, such as the C,M,Y,K color space, can be represented by a color located at an averaged position for those colors.

Thus, those skilled in the art will appreciate that colors stored in the variance color look-up table can be dynamically selected to accurately represent colors included in the original frame of image data or, under certain conditions, can be selected wholly independent of the original 32-bit colors values included in pixel of the incoming image data. The flexibility associated with exemplary embodiments described herein can be exploited such that the dominant colors included within any frame of image data are dynamically identified on a page-by-page basis. Based on this identification, the selector, the C0/C1 encoding table and/or the variance color look-up table can be modified (e.g., replaced with updated values). Alternately, a different C0/C1 encoding table and/or variance color look-up table can be selected for compression based on the dominant colors identified. In other words, the colors that best represent a given frame can be used in conjunction with the compression of image data associated with that frame.

Figure 5B:
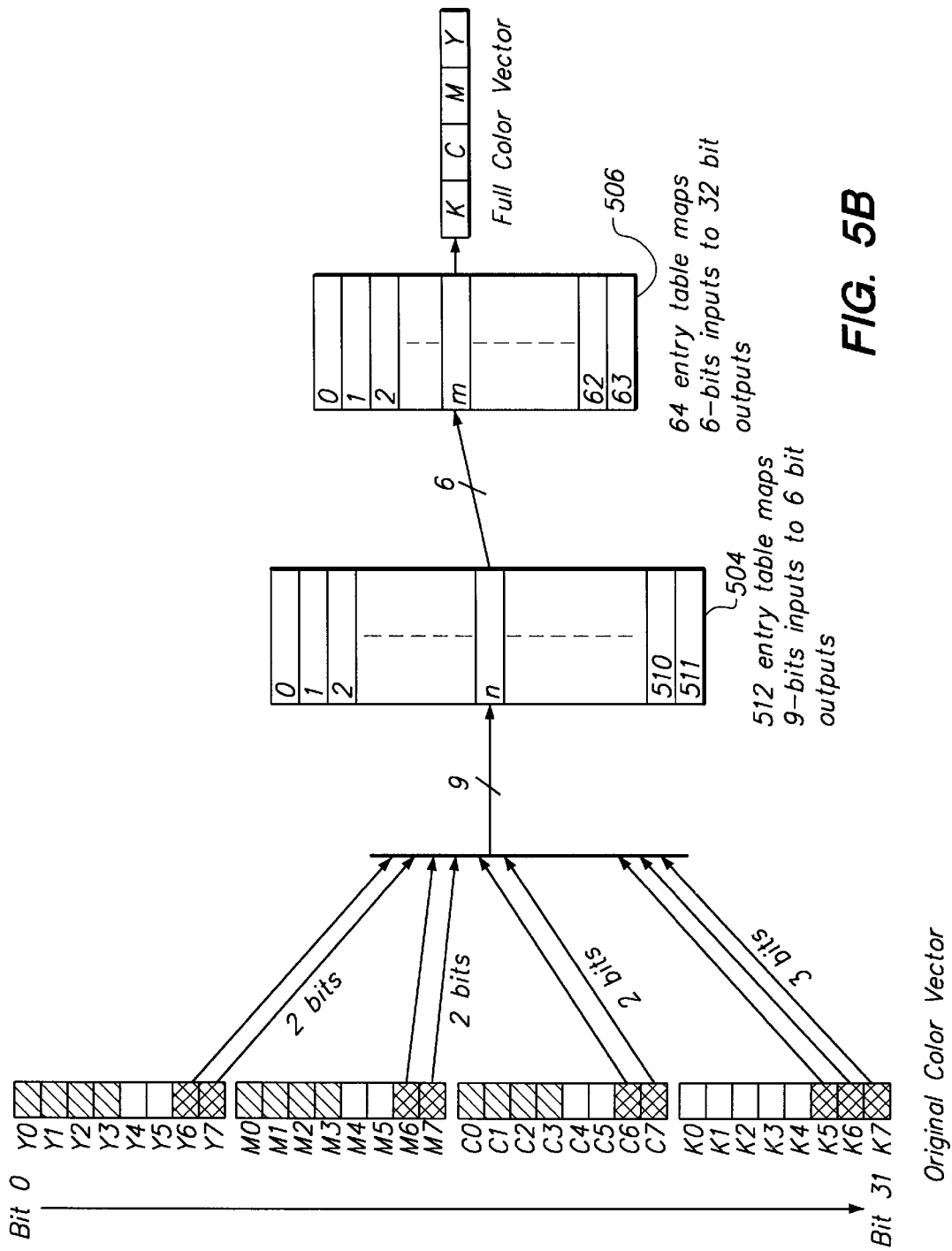
Figure 5C:
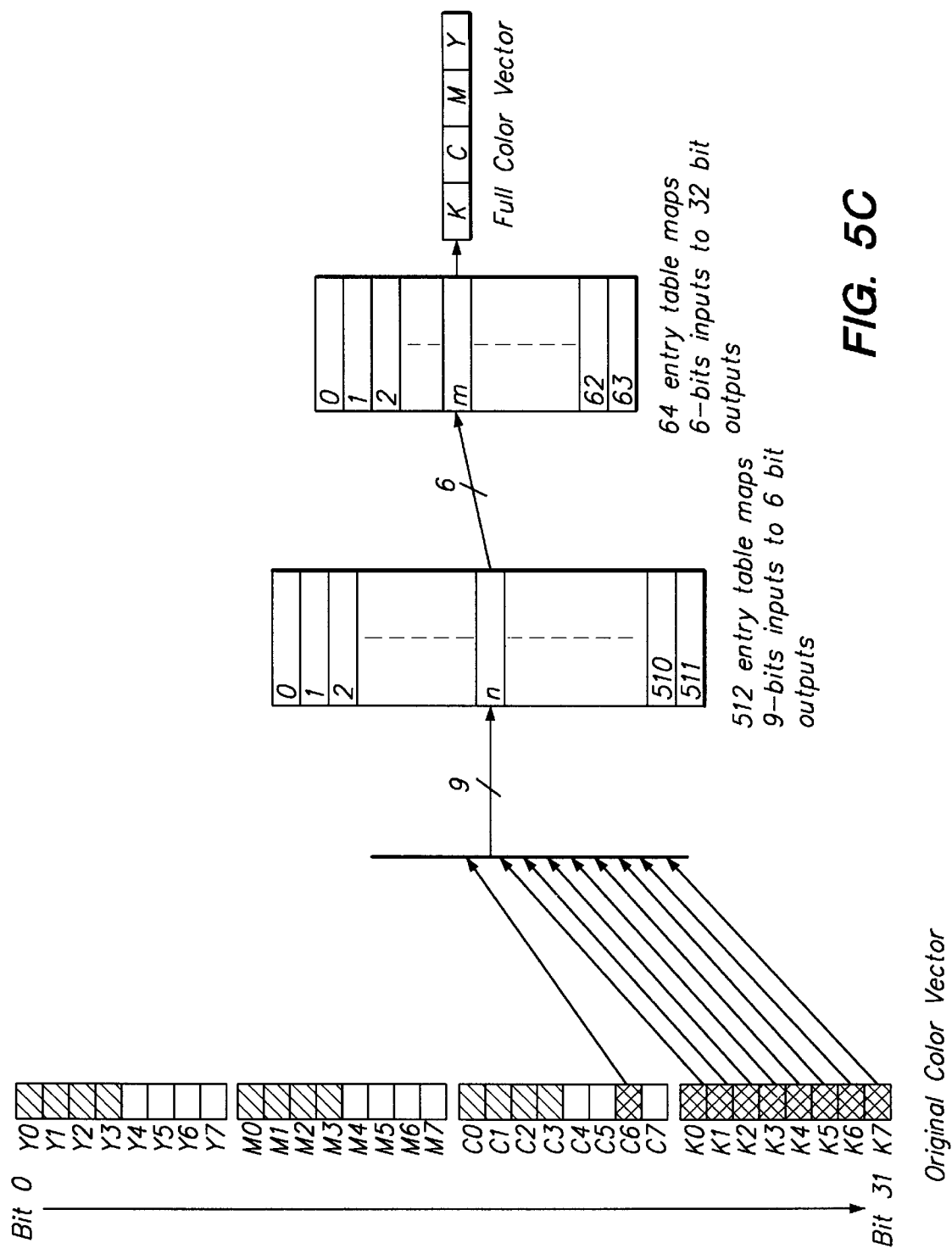

FIG. 5b illustrates an alternate embodiment wherein the first and second steps of prequantization described with respect to FIG. 5a are implemented by directly selecting a set number of bits (for example, 9-bits to be consistent with the FIG. 5a example). The set number of bits is then encoded to compress the prequantized data into a color index (for example, a 6-bit color index) used to address the variance color look-up table. FIG. 5c illustrates an exemplary embodiment where the prequantization of FIG. 5b results in a user-configured selection of 1-bit of cyan and all 8-bits of black.

Those skilled in the art will appreciate that the dynamic encoding of color values during image processing in conjunction with the use of a two level color encoding in accordance with exemplary embodiments, provides a relatively high level of color fidelity for partitioned blocks of image data which include edge information. Further, a two level color encoding which includes a single encoding table (that is, the exemplary 512 entry C0/C1 encoding table), provides high speed compression suitable for real-time processing.

Exemplary embodiments of the present invention therefore provide the user a high degree of flexibility by allowing for the arbitrary selection of many combinations of C,M,Y and K image data. The selector can be used to quickly reduce the input-image data in a manner which does not inhibit adaptability to any user-specific criteria. Further, the selector generates an output (the exemplary 9-bit value) that can address an encoding table, the output of the encoding table being an index which represents a color that is dynamically selected to provide an optimal representation of the original 32-bit color data.

5. Compression/Decompression Coprocessor (CDC)

Those skilled in the art will appreciate that after the input frame of image data has been processed to build the variance color look-up table, this table can then be used to compress the entire frame of input image data in a manner as described in the aforementioned U.S. application Ser. No. 08/397,372. Alternately, in accordance with exemplary embodiments, a dynamic band recompression scheme, as described in commonly assigned, copending U.S. application Ser. No.08/463, 783, filed Jun. 5, 1995, entitled "METHOD AND APPARATUS FOR COMPRESSION OF DIGITIZED IMAGE DATA USING A DYNAMIC BAND RECOMMISSION SCHEME", the disclosure of which is hereby incorporated by reference in its entirety, can be used to compress data as the variance color look-up table is being created.

Where the image data is compressed in accordance with exemplary embodiments of the present invention, a complementary decompression technique can be provided. The decompression can be performed in a manner similar to that described in the aforementioned commonly assigned U.S. application Ser. No. 08/397,372.

Those skilled in the art will further appreciate that exemplary embodiments of the present invention for compressing color variant data can, if desired, be used in connection with compression of any image data in any format. For example, exemplary embodiments of the invention as described with respect to color variant data blocks can equally be used for color invariant data blocks to reduce the data required to represent a single color invariant data block. Further, exemplary embodiments of compressing color variant image data in accordance with exemplary embodiments, can be used for any environment including printing, video display and so forth.

While the foregoing has set forth exemplary embodiments of the present invention, those skilled in the art will appreciate that these examples are by way of illustration only. For example, while exemplary embodiments have been described in connection with data compression with respect to pixmaps used in connection with printing, those skilled in the art will appreciate that techniques of the present invention are also suitable for the reduction of information transmitted between computers, or between a computer and an input device such as a scanner, or between a computer and an output device (such as a printer).

Further, those skilled in the art will appreciate that the partitioned blocks described above can be of any dimension. Further, the partitioning can be adaptive and dynamic, even within a given frame of image data, with the only requirement being that dimensional information be made known to the decompression process.

Exact dimensions of compressed and decompressed data blocks can also be modified as desired by the user, and the 29-bit value for compressed data blocks is by way of example only. Further, the compressed data and decompressed data block size need not remain fixed, but could be varied from block-to-block. Encoded variant and invariant block sizes can also be different from one another.

In addition, those skilled in the art will appreciate that a fixed color palette need not be used. Rather, the color palette can be dynamically assigned as long as the update information is part of the compressed data storage or stream.

Although variant blocks as described in the exemplary embodiment above are encoded as a 1-bit mask with two sub-palettes of a larger color palette, those skilled in the art will appreciate that masks of any size can be used. For example, a mask of 3-bits for each pixel can be used, with each 3-bits pointing to a palette or sub-palette of eight color values.

Those skilled in the art will further appreciate that invariant blocks need not correspond to blocks where all pixels have the same value. Rather, blocks with pixels that fall within an acceptable range can be mapped into an invariant color block, using a value that represents the entire block, with no visible degradation.

In accordance with alternate embodiments, those skilled in the art will appreciate that the variant and non-variant select indicator bit for each block need not be specifically encoded. For example, if a large area of the pixmap is non-variant, then the selector bit can be further compressed. For example, the selector bit can be encoded in run length fashion.

Further, known compression techniques can be used in conjunction with the compression techniques of the present invention. For example, two successive non-variant blocks can be encoded using a repeat flag, without having to encode the full information for the second and successive blocks. Further, where successive non-variant blocks differ only slightly from a preceding non-variant block, the known compression technique of delta modulation can be used to further compress the data. This use of such known compression techniques in accordance with the present invention is by way of illustration only, and any number of known compression techniques can be used in accordance with the present invention to improve compression.

Further, while compression has been described with respect to all components of a given pixel at one time, those skilled in the art will appreciate that the color components can be compressed separately.

It will be appreciated by those skilled in the art that the present invention can be embodied in other specific forms without departing from the spirit or essential characteristics thereof. The presently disclosed embodiments are therefore considered in all respects to be illustrative and not restricted. The scope of the invention is indicated by the appended claims rather than the foregoing description and all changes that come within the meaning and range and equivalence thereof are intended to be embraced therein.

What is claimed is:

1. A method for processing a frame of image data comprising the steps of:
   encoding each detected color in said frame of image data with an index value to a look-up table during compression of said frame of image data;
   storing a plurality of color values in said look-up table which correspond to each of said detected colors; and
   dynamically updating said plurality of color values stored in said look-up table when a number of colors detected in said frame of image data exceeds a predetermined number, including iteratively reducing a number of bits used to detect each color prior to the step of encoding until the number of detected colors is less than or equal to the predetermined number.

2. A method according to claim 1, wherein said frame of image data includes a plurality of pixels each of which is represented by a color value.

3. A method according to claim 2, wherein the color value of each pixel is represented by at least one color component.

4. A method according to claim 3, wherein the color of each pixel in said frame of image data is represented using C,M,Y,K color components in said look-up table.

5. A method according to claim 4, wherein each of said C,M,Y,K color components is an 8-bit value.

6. A method according to claim 3, wherein a color of each pixel in said frame of image data is represented as a value having a variable grey scale level.

7. A method according to claim 3, wherein a color value of each pixel in said frame of image data is represented with at least 32-bits.

8. A method according to claim 1 further including the step of:
   replacing the color values stored in said look-up table while reprocessing said frame of image data during said step of iteratively reducing.

9. A method according to claim 1, further including the step of:
   selecting, prior to said step of encoding, a predetermined combination of bits used to represent each detected color in said frame of image data.

10. A method according to claim 9, wherein said step of encoding further includes a step of:
    mapping the predetermined combination of bits to said index value.

11. A method according to claim 9, wherein said look-up table includes a plurality of color values which correspond to different colors which are independent of colors included in said frame of image data.

12. A method according to claim 1, further including a step of:
    decompressing said compressed image data using the color values of said look-up table.

13. A method according to claim 1, wherein said step of encoding further includes a step:
    mapping bits used to represent each detected color in said frame of image data to said index value using a plurality of look-up tables.

14. Apparatus for processing a frame of image data comprising:
    a look-up table for storing a plurality of color values; and
    a processor for encoding each detected color in a frame of image data with an index value to said look-up table during compression of said frame of image data, and for dynamically updating said plurality of color values stored in said look-up table when a number of different colors detected in said frame of image data exceeds a predetermined number by iteratively reducing a number of bits used to detect each color until the number of detected colors is less than or equal to the predetermined number.

15. Apparatus according to claim 14, wherein said frame of image data includes a plurality of pixels, each of which is represented by a color value, and wherein said processor further includes:
    a selector for selecting a predetermined combination of bits used to represent a detected color for each pixel in said frame of image data.

16. Apparatus according to claim 15, wherein said processor further includes:

a plurality of look-up tables for mapping said predetermined combination of bits for each detected color to said index value.

17. Apparatus according to claim 14, further including:

a processor for decompressing color values for each of a plurality of pixels included in said frame of image data.

18. Apparatus according to claim 14, wherein each detected color in said frame of image data is represented with at least 32-bits, and is compressed to a 6-bit index value to said look-up table.

19. Apparatus according to claim 14, wherein each detected color is represented in said look-up table by C,M,Y,K color components.

* * * * *